Dec. 28, 1965    M. McCLURE    3,225,743
HOPPER AND TROUGH FEEDER WITH ADJUSTABLE SUPPLY MEANS
Filed Nov. 28, 1962    2 Sheets-Sheet 1
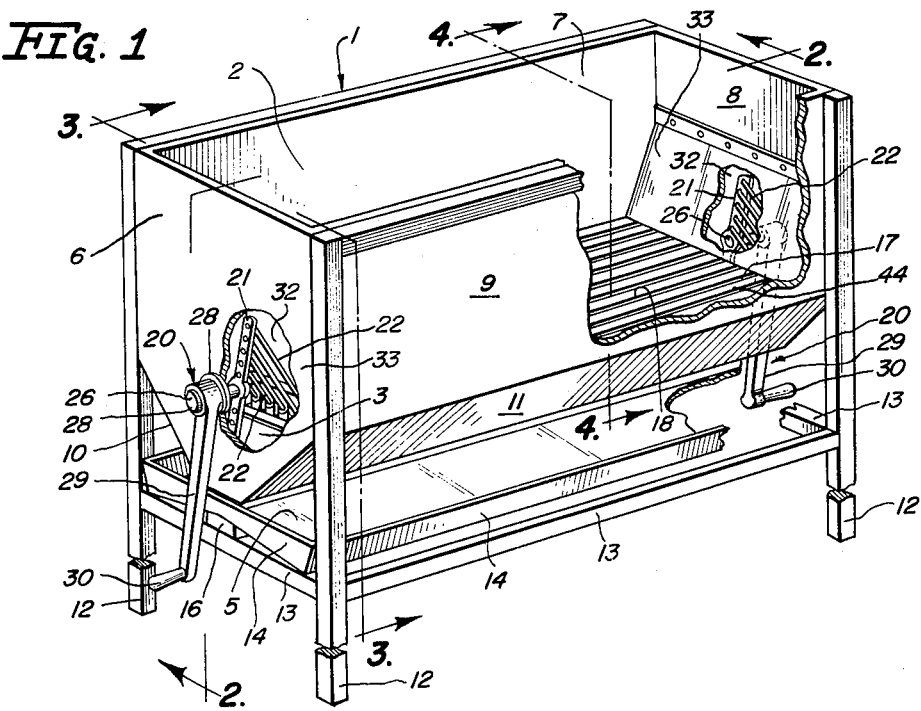
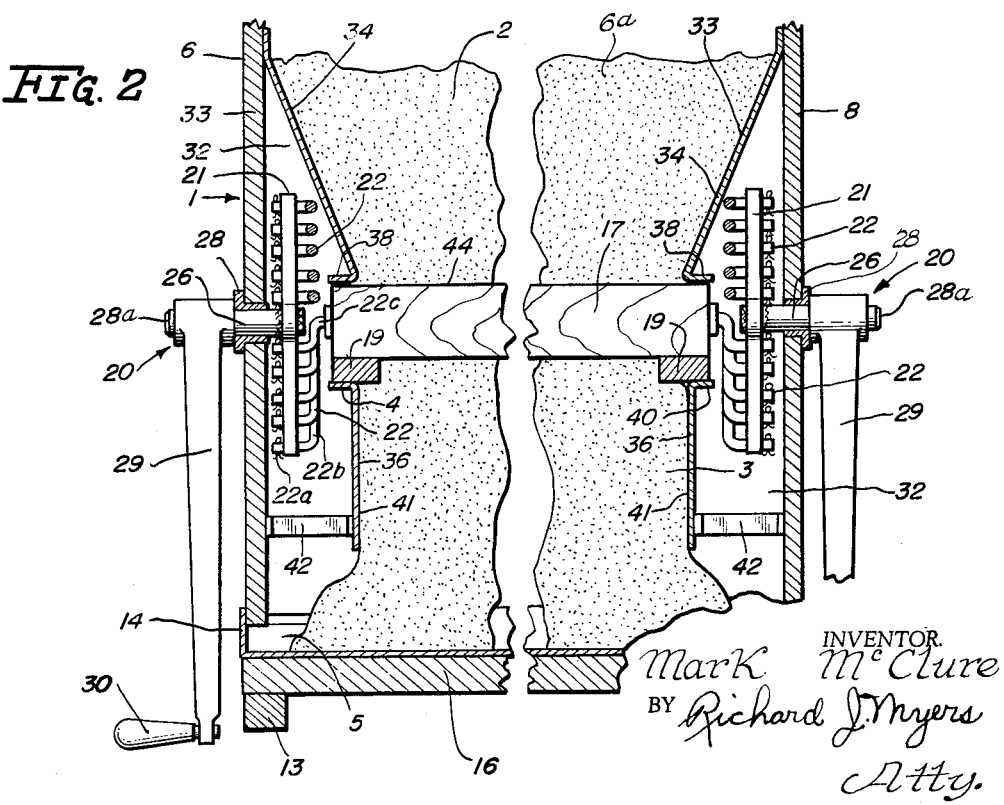
INVENTOR.
Mark McClure
BY Richard J. Myers
Atty.

Dec. 28, 1965     M. McCLURE     3,225,743
HOPPER AND TROUGH FEEDER WITH ADJUSTABLE SUPPLY MEANS
Filed Nov. 28, 1962     2 Sheets-Sheet 2
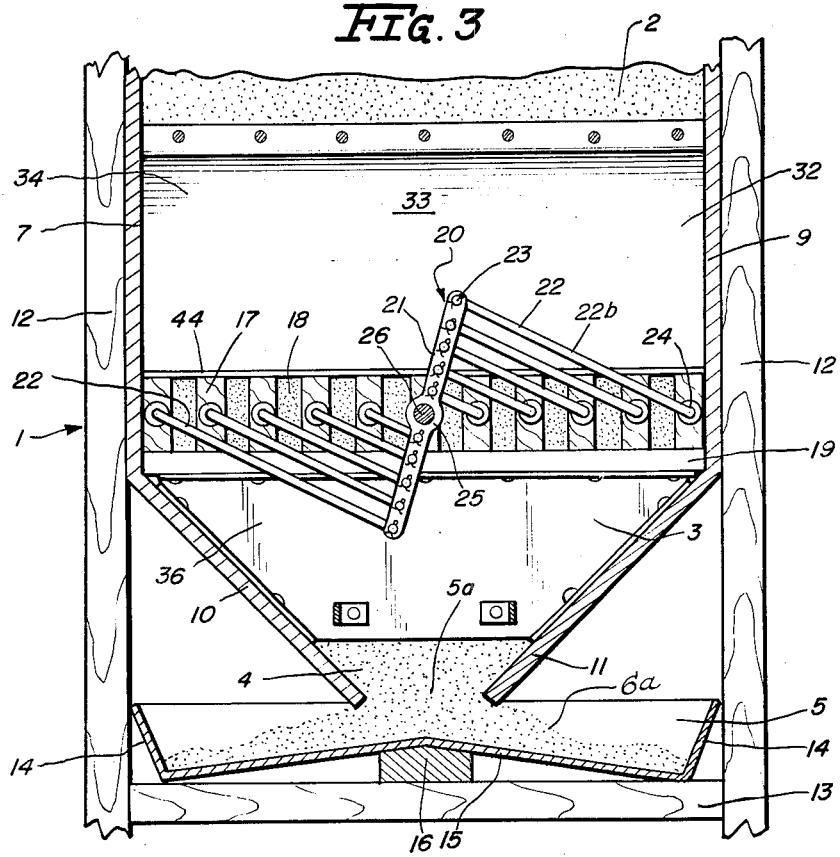
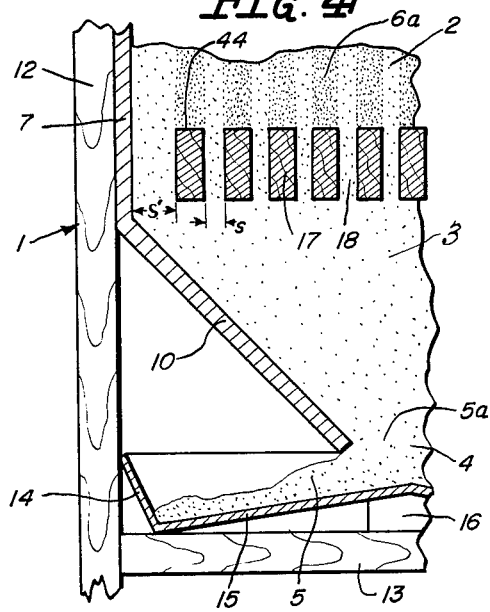
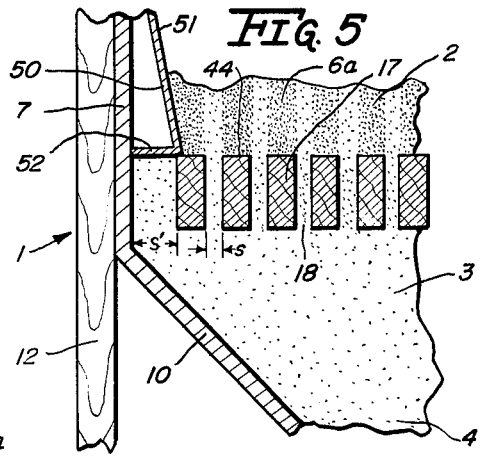
INVENTOR.
Mark McClure
BY Richard J. Myers
Atty.

United States Patent Office 3,225,743
Patented Dec. 28, 1965

3,225,743
HOPPER AND TROUGH FEEDER WITH ADJUSTABLE SUPPLY MEANS
Mark McClure, 621 Oneida, Joliet, Ill.
Filed Nov. 28, 1962, Ser. No. 246,286
9 Claims. (Cl. 119—53)

This invention relates to improvements in grain feeders and in particular to grain feeders for cattle and the like.

It is therefore a general object of this invention to provide a new and improved grain feeder which may be used to supply granular material or grain to a bin for a use such as feed to cattle or the like.

It is another object of this invention to provide a feeder of this character equipped with simple and efficient means for discharging the feed from the hopper to the feeding trough and which is so constructed that any desired amount may be fed.

Another object of this invention is to provide a grain feeder that is constructed to so support the grain that it is not trapped or entrained in the throat of the feeder so as to prevent discharge through the throat into the animal feed trough.

It is another object of this invention to provide a grain feeder that is provided with a plurality of support beams to carry a certain percentage of the grain load in aid of allowing the grain to flow through the funnel or throat of the grain bin into the animal grain trough.

Still another object of this invention is to provide control means for regulating the rate of flow of different size and types of feed grain depending on the farm animal fed and the type of grain fed the particular animal.

These and other objects will become apparent from reference to the following description, the attached drawings and the appended claims. Although certain specific embodiments of the invention are to be shown and described, it is obvious that modifications thereof are possible. The invention, therefore, is not to be restricted except insofar as it is necessitated by the prior art and by the spirit of the appended claims.

In the accompanying drawings:

FIGURE 1 is a perspective view of my novel grain feeder, wherein there are parts broken away and in section;

FIGURE 2 is an enlarged sectional view of the grain feeder taken along line 2—2 of FIGURE 1;

FIGURE 3 is another enlarged sectional view taken along line 3—3 of FIGURE 1;

FIGURE 4 is an enlarged sectional view taken along line 4—4 of FIGURE 1; and

FIGURE 5 is an enlarged sectional view showing a modification of the grain feeder portion as shown in FIGURE 4.

With reference to the figures now, there is shown a grain feeder or hopper 1 having an upper compartment 2, a lower compartment or funnel part 3 including a throat portion 4 having an opening 5a for allowing grain 6a to spill into an animal trough 5. The upper and lower compartments 2 and 3 are generally defined by upright walls 6, 7, 8 and 9 and tapered walls 10 and 11, the compartments 2 and 3 being supported by legs 12. Reinforcing beams 13 strengthen and rigidify the legs 12. The trough 5 has side walls 14 and bottom wall 15, the trough 5 being supported by beam 16 carried on top of the support members 13.

The division between the upper compartment 2 and the lower compartment 3 is generally defined by a plurality of divider or separator beams 17 which extend the length of the hopper 1 and are separated from one another by the spaces 18 between them. Each of these separators or grain load suppporting elements 17 are carried on the end cross beam 19. The elements 17 may all be moved toward one another so that all the spaces 18 between them may be eliminated or the members 17 may be so located that the spaces 18 between them is a maximum distance. This is accomplished by movement of these grain load support beams 17 toward and away from one another. Two control mechanisms 20, 20 are provided to accomplish this. Each control mechanism 20 comprises a lever 21 having a plurality of rods 22 pivotally connected to the lever 21 as at 23. The other end of the rod is pivotally connected to a respective member 17 as at 24. The length of these rods 22 increase as they connect with load support beams 17 that are farther removed away from the center of the lever 21 and decrease in length the closer that a respective support beam member 17 is to the center of the lever 21. As viewed in FIGURE 2, each one of the rods or cranks 22 is somewhat Z-shaped and has a connection leg portion 22a coupled to the lever 21, a medial elongated portion 22b, and an end leg portion 22c connecting a respective lath or grain load support member 17. The central portion 25 of the lever 21 has a shaft 26 rigidly secured to it, the shaft 26 being journalled in the bearing 28 in each of the walls 6 and 8. The outside end 28a of the shaft 26 has an arm 29 rigidly secured about it and a handle 30 is at the end of arm 29 to be held by an operator. Each control mechanism 20 is located within an enclosed area 32 on a respective side 6 or 8 as defined by a housing 33 formed by the wall portion 6 or 8 and the walls of plates 34 and 36. The lower part of the wall 34 has a protective flange 38 extending just above and across each of the members 17 to prevent grain 6a from falling in chamber 32. The lower wall 36 has an upper flange portion 40 bolted to the support member 19 and a downwardly extending plate portion 41 being supported against the wall 6 by tie member 42.

The grain is poured into the top 2 of the hopper and proceeds to fill chambers 2 and 3 and spill into the trough 5 by way of spacer 18 between the members 17.

It will be appreciated that some of the grain is bearing on the inside of the sloping walls 10 and 11 of the compartment 3 and at the restriction or opening 5a of the throat portion 4 while the remaining load of the grain is carried by the upper surfaces 44 of each of the elements 17. Depending on the size of the grain the members 17 may be moved closer together or farther apart. For fine grain feed the elements 17 may be moved closer together and for coarse grain feed the elements 17 may be moved farther apart. As shown in FIGURE 4, as the elements 17 are contracted, space S' exists at the sides of the hopper that is greater than the space S between the members 17. In a modified form, as shown in FIGURE 5, a wall 50 runs the extent of each side, the wall 50 having a generally vertical 51 and a horizontal part 52 just above the top surface of the elements 17. By this modification whether the elements 17 are contracted toward one another or expanded no grain in the upper compartment 2 is allowed to pass to the lower compartment 3 between the end support beams 17 and the walls 7 or 9.

Thus, it can be seen that by putting in these movable wall or beam sections 17, a portion of the grain 6a is supported in column fashion over a respective member 17 and a portion of the grain is supported in the lower compartment 3 with the resultant effect that there is an easy flow of grain through the throat portion 4. The flow of grain out of the compartments 2 and 3 into the trough 5 is further aided by the fact that these grain load support members 17 may be agitated at either of their ends to shuffle or thread the grain 6a through the members 17 should the grain become clogged within the hopper and yet the control mechanism 20 allows incremental adjustment of the ratio of grain being supported by the member 17 to the ratio of grain flowing between these members and into the compartment 3 and trough 5 and in accordance with the finess or coarseness of the grain fed to the cattle or other livestock. It is to be noted that the grain 6a supported by movable beams 18 forms static grain columns so that the grain between the static columns of grain 6a is allowed free movement downward thus allowing the columns of grain 6a to spill more grain into the free downward moving grain between the columns. The columns of grain 6a are graphically illustrated for schematic purposes only in FIGURES 4 and 5 by a heavier concentration of grain particles, the actual concentration of grain throughout usually is uniform.

While I have herein shown and described my invention in what I conceive to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A grain feeder comprising;
   (a) a storage compartment including generally upright walls defining an enlarged area,
   (b) a discharging compartment including tapering walls defining a spill orifice of lesser area than the enlarged area,
   (c) a grain receiving feed trough beneath the orifice,
   (d) and a plurality of movable separator elements spaced apart from one another dividing the storage compartment from the discharging compartment and defining generally vertically extending grain flow spaces between the elements each separator element having an upward generally vertical facing grain load-sustaining surface adapted to carry a generally vertical static column of grain for allowing a vertical column of grain in a grain flow space between two successive elements to gravity flow freely and reduce grain load conjestion in the spill orifice, and support means holding the elements in the feeder and maintaining the upward surfaces facing vertical and providing for moving of the separator elements generally laterally toward and away from one another for increasing and decreasing the spaces between the elements,
   (e) and element shifting means mounted on the grain feeder for moving the elements over the support means toward and away from one another for decreasing and increasing the spaces.

2. The invention according to claim 1 and said means comprising;
   (a) a member mounted for rotational movement,
   (b) and link means operatively connected between each of the elements and the member for general linear movement of the elements.

3. The invention according to claim 1 and one of said separator elements defining with one upright wall an end space, and grain flow obstructing means mounted on said one upright wall over said one separator and preventing the flow of grain in the end space between the storage compartment and the discharging compartment.

4. A grain feeder comprising;
   (a) an upper grain storage compartment having upright closing walls,
   (b) a lower grain discharging compartment having downwardly tapering side walls forming a funnel depending from the closing walls,
   (c) said side walls defining at their lower ends a grain outlet,
   (d) a plurality of horizontal beam members supported in the upper compartment,
   (e) and a plurality of horizontal beam separators slidably resting on the beam members and extending to and between the closing walls and above the funnel of the discharging compartment and defining variable grain flow spaces between the separators, each separator having an upward generally vertical facing grain loading sustaining surface adapted to carry a generally vertical static column of grain for allowing a column of grain in a grain flow space between two successive separators to gravity flow freely and reduce grain load conjestion in the spill orifice, and said beam members holding the separators in the feeder and maintaining the upward surfaces facing vertical and providing for moving of the separator generally laterally toward and away from one another for increasing and decreasing the spaces between the separators,
   (f) and separate shifting means mounted on the grain feeder for moving the beam separators toward and away from one another and the closing walls for decreasing and increasing the spaces.

5. A grain feeder comprising;
   (a) an upper grain storage compartment having upright closing walls,
   (b) a lower grain discharging compartment having downwardly tapering side walls forming a funnel depending from the closing walls,
   (c) said side walls defining at their lower ends a grain outlet,
   (d) a plurality of horizontal beam members supported in the upper compartment,
   (e) and a plurality of horizontal beam separators slidably resting on the beam members and extending to and between the closing walls and above the funnel of the discharging compartment and defining variable grain flow spaces between the separators, each separator having an upward generally vertical facing grain loading sustaining surface adapted to carry a generally vertical static column of grain for allowing a column of grain in a grain flow space between two successive separators to gravity flow freely and reduce grain load conjection in the spill orifice, and said beam members holding the separators in the feeder and maintaining the upward surfaces facing vertical and providing for moving of the separator generally laterally toward and away from one another for increasing and decreasing the spaces between the separators,
   (f) and separator shifting means mounted on the grain feeder for moving the beam separators toward and away from one another and the closing walls for decreasing and increasing the spaces,
   (g) said means comprising a member mounted for rotational movement and link means operatively connected between each of the separators and the member.

6. A grain feeder comprising;
   (a) an upper grain storage compartment having upright closing walls,
   (b) a lower grain discharging compartment having downwardly tapering side walls forming a funnel depending from the closing walls,
   (c) said side walls defining at their lower ends a grain outlet,
   (d) a plurality of horizontal beam members supported in the upper compartment,
   (e) and a plurality of horizontal beam separators slidably resting on the beam members and extending to and between the closing walls and above the funnel of the discharging compartment and defining variable grain flow spaces between the separators, each separator having an upward generally vertical facing grain loading sustaining surface adapted to carry a generally vertical static column of grain for allowing a column of grain in a grain flow space between two successive separators to gravity flow freely and reduce grain load conjestion in the spill orifice, and said beam members holding the separators in the feeder and maintaining the upward surfaces facing vertical and providing for moving of the separator generally laterally toward and away from one another for increasing and decreasing the spaces between the separators,
(f) and separator shifting means mounted on the grain feeder for moving the beam separators toward and away from one another and the closing walls for decreasing and increasing the spaces,
(g) said means including a shaft rotatively mounted on the closing wall generally centrally of the separators,
(h) an operator handle constrained for rotation with the shaft outwardly of one closing wall,
(i) an elongated member constrained for rotation with the shaft inwardly of the one closing wall,
(j) a plurality of links located on the elongated member above the shaft and connecting the elongated member with the separator to one side of elongated member and a plurality of links located on the elongated member below the shaft and connecting the elongated member with the separators to the other side of the elongated member.

7. A grain feeder comprising;
(a) an upper grain storage compartment having upright closing walls,
(b) a lower grain discharging compartment having downwardly tapering side walls forming a funnel depending from the closing walls,
(c) said side walls defining at their lower ends a grain outlet,
(d) a plurality of horizontal beam members supported in the upper compartment,
(e) and a plurality of horizontal beam separators slidably resting on the beam members and extending to and between the closing walls and above the funnel of the discharging compartment and defining variable grain flow spaces between the separators, each separator having an upward generally vertical facing grain loading sustaining surface adapted to carry a generally vertical static column of grain for allowing a column of grain in a grain flow space between two successive separators to gravity flow freely and reduce grain load conjestion in the spill orifice, and said beam members holding the separators in the feeder and maintaining the upward surfaces facing vertical and providing for moving of the separator generally laterally toward and away from one another for increasing and decreasing the spaces between the separators,
(f) and separator shifting means mounted on the grain feeder for moving the beam separators toward and away from one another and the closing walls for decreasing and increasing the spaces,
(g) said means comprising a member mounted for rotational movement and link means operatively connected between each of the separators and the member,
(h) and shield means on the inside of the closing walls encasing the link means and the member from the interior of the compartments.

8. The invention according to claim 7 and one of the separators defining with one closing wall an end space, and grain flow obstructing means mounted on said one closing wall and preventing the flow of grain in the end space between the storage compartment and the discharging compartment.

9. A grain feeder comprising;
(a) a storage compartment including generally upright walls defining an enlarged area,
(b) a discharging compartment including tapering walls defining a spill orifice of lesser area than the enlarged area,
(c) a grain receiving feed trough beneath the orifice,
(d) and a plurality of movable separator elements spaced apart from one another dividing the storage compartment from the discharging compartment and defining generally vertically extending grain flow spaces between the elements each separator element having an upward generally vertical facing grain load-sustaining surface adapted to carry a generally vertical static column of grain for allowing a vertical column of grain in a grain flow space between two successive elements to gravity flow freely and reduce grain load conjestion in the spill orifice, and support means holding the elements in the feeder and maintaining the upward surfaces facing vertical and providing for moving of the separator elements generally laterally toward and away from one another for increasing and decreasing the spaces between the elements,
(e) and means mounted on the grain feeder for moving the elements toward and away from one another for decreasing and increasing the spaces,
(f) said means comprising a pair of separator shifting structures, each structure being mounted at opposed ends of the separator elements and on a respective upright wall, each structure comprising a member mounted for rotational movement and link means operatively connected between each of a respective opposed end of the elements and the member for providing movement of both opposed ends of the separators toward and away from each other.

References Cited by the Examiner

UNITED STATES PATENTS

| 698,182 | 4/1902 | Drake | 222—505 X |
|---|---|---|---|
| 1,443,181 | 1/1923 | Hill | 222—505 X |
| 1,707,343 | 4/1929 | Allen | 222—505 X |
| 2,171,998 | 9/1939 | Trapani | 119—53 |
| 2,859,707 | 11/1958 | Dorey | 222—505 X |

FOREIGN PATENTS

| 108,616 | 9/1939 | Australia. |
|---|---|---|
| 1,904 | 3/1894 | Great Britain. |

ABRAHAM G. STONE, *Primary Examiner.*

ANTONIO F. GUIDA, *Examiner.*

J. O. BOLT, *Assistant Examiner.*